Nov. 19, 1929.   W. A. GOFF   1,736,077
BRICK JOINT RAKER
Filed Nov. 12, 1927
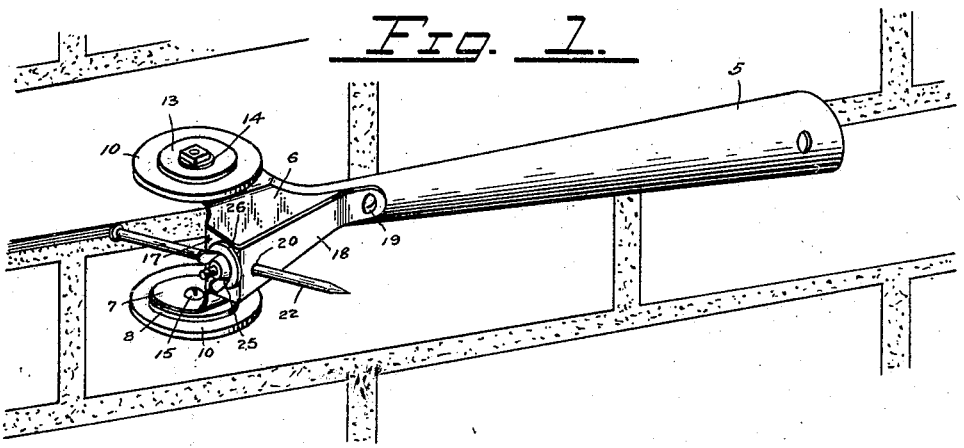
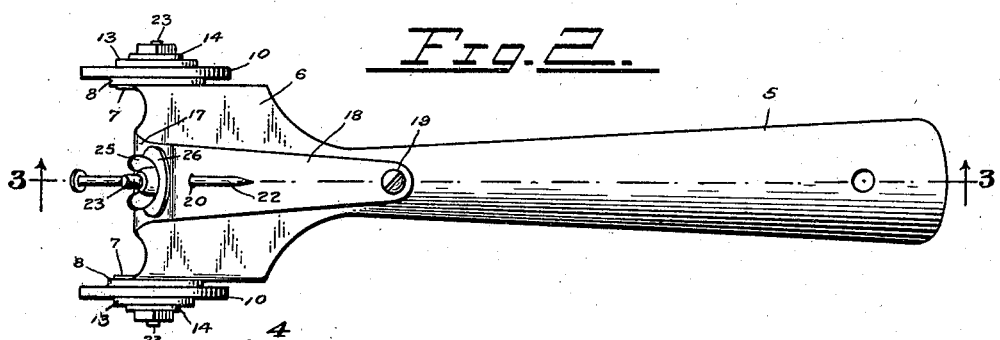
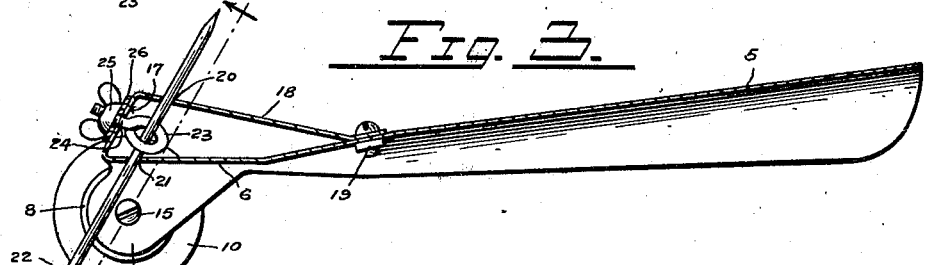
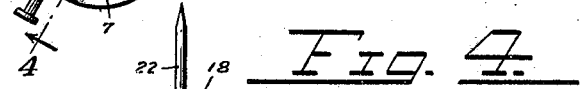
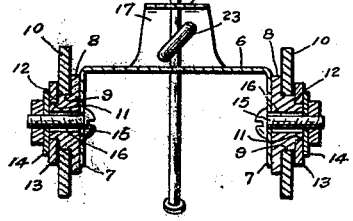
Inventor
William A. Goff
By John W. Maupin.
Attorney Patented Nov. 19, 1929

1,736,077

UNITED STATES PATENT OFFICE

WILLIAM A. GOFF, OF SEATTLE, WASHINGTON

BRICK-JOINT RAKER

Application filed November 12, 1927. Serial No. 232,893.

My invention relates to brick joint rakers and the principal object of the invention is to provide a simple and inexpensive raker by means of which the surplus mortar that bulges out between newly laid bricks may be readily removed leaving a clean and neat joint. Further objects are to provide novel means for adjusting the raker member and novel means for mounting and adjusting the wheels.

With the above and other objects in view which will appear as the description proceeds the invention consists of the novel construction, adaptation, combination and arrangement of parts hereinafter described and claimed. These objects are accomplished by devices illustrated in the accompanying drawings; wherein:—

Figure 1 is a view in perspective showing the application of my device;

Fig. 2 is a top plan view of the raker;

Fig. 3 is a view in longitudinal vertical section taken substantially on a broken line 3, 3 of Fig. 2; and Fig. 4 is a view in transverse section taken on a broken line 4, 4 of Fig. 3.

Referring to the drawings throughout which like reference numerals designate like parts, the numeral 5 indicates the rounded handle which is flattened to form a relatively wide body portion 6 whose outer rounded end portions are bent downwardly to form oppositely disposed bearing lugs 7.

Referring particularly to Fig. 4 of the drawings, the numeral 8 designates bearing members that are reduced at 9 to form annular portions upon which wheels 10 are revolubly mounted as clearly shown. Said reduced portions are slightly wider than said wheels and are further reduced at 11 to form annular shoulders 12. Washers 13 are mounted on the last named portions and bear against said annular shoulders so that the wheels may revolve freely as will be understood.

Smaller washers 14 abut against the outer reduced ends of the bearings 8 and hold the aforesaid larger washers 13 in place. Screw bolts 15 pass through holes in the lugs 7 and nuts on their outer ends hold the bearings and washers securely in place. The holes 16 through said bearings 8 and through which the screw bolts pass are larger than said screw bolts so that said bearings may be shifted to adjust the wheels 10 as will be understood without a description in detail.

The body portion 6 is reduced to form a tongue that is bent upwardly to form a slanting portion 17 and then backward to form a bridge portion 18 whose end is secured to the handle 5 by means of a screw bolt 19. A hole 20 is provided through said bridge and a hole 21 is provided through the body portion 6 for reasons presently set forth.

For the raker member 22 I ordinarily use a wire nail as shown in the drawings. Said nail is passed through the holes 20 and 21 with its point up and its head projecting down slightly beyond the peripheral alignment of the wheels 10 so that it may readily engage the mortar.

The means for adjusting the raker member 22 comprises a screw-eye 23 whose threaded end passes through a hole 24 in the slanting portion 17 and is provided with a thumb nut 25 with a washer 26 interposed therebetween. Said raker member passes through the eye portion of said screw-eye and when the thumb nut is tightened up same will cause the raker member to be jammed within the holes 20 and 21. Thus it will be readily understood that the raker member may be adjusted to project any desired length.

Referring to Fig. 1 in the use of my device same is either drawn or pushed along with the wheels 10 riding on the bricks and the head of the raker member 22 traveling within the joints between the bricks. It is usually necessary to pass said raker along the upper edge of the joint as shown in the drawings and again along the lower edge of the joint to completely remove the surplus mortar and leave a clean joint.

Having thus described my invention, it being understood that minor changes may be resorted to in its construction without departing from its scope and spirit, what I claim and desire to secure by Letters Patent of the United States is:

A brick joint raker comprising a handle, a body portion having bearing lugs, bearings members mounted in said lugs, wheels for said members, means for adjusting said wheels, a bridge portion for the forward end of said body having its end secured thereto, a raker member mounted in holes through said bridge and body, and screw eye-bolt securing and adjusting means for said raker member.

In witness whereof, I hereunto subscribe my name this 12th day of October A. D. 1927.

WILLIAM A. GOFF.